Sept. 1, 1959 L. R. BROWN 2,902,616

BEAM DEFLECTION APPARATUS FOR CATHODE RAY TUBES

Filed May 23, 1955 3 Sheets-Sheet 1

INVENTOR.
LAURENCE R. BROWN
BY
Allen V. Hazeltine
ATTORNEY

Sept. 1, 1959 L. R. BROWN 2,902,616

BEAM DEFLECTION APPARATUS FOR CATHODE RAY TUBES

Filed May 23, 1955 3 Sheets-Sheet 2

INVENTOR.
LAURENCE R. BROWN

BY

Allen V. Hazeltine

ATTORNEY

Sept. 1, 1959 L. R. BROWN 2,902,616

BEAM DEFLECTION APPARATUS FOR CATHODE RAY TUBES

Filed May 23, 1955 3 Sheets-Sheet 3

INVENTOR.
LAURENCE R. BROWN
BY
[signature]
ATTORNEY

United States Patent Office 2,902,616

Patented Sept. 1, 1959

2,902,616

BEAM DEFLECTION APPARATUS FOR CATHODE RAY TUBES

Laurence R. Brown, Berwyn, Pa., assignor to Philco Corporation, Philadelphia, Pa., a corporation of Pennsylvania Application May 23, 1955, Serial No. 510,245

3 Claims. (Cl. 313—76)

Figure 1:
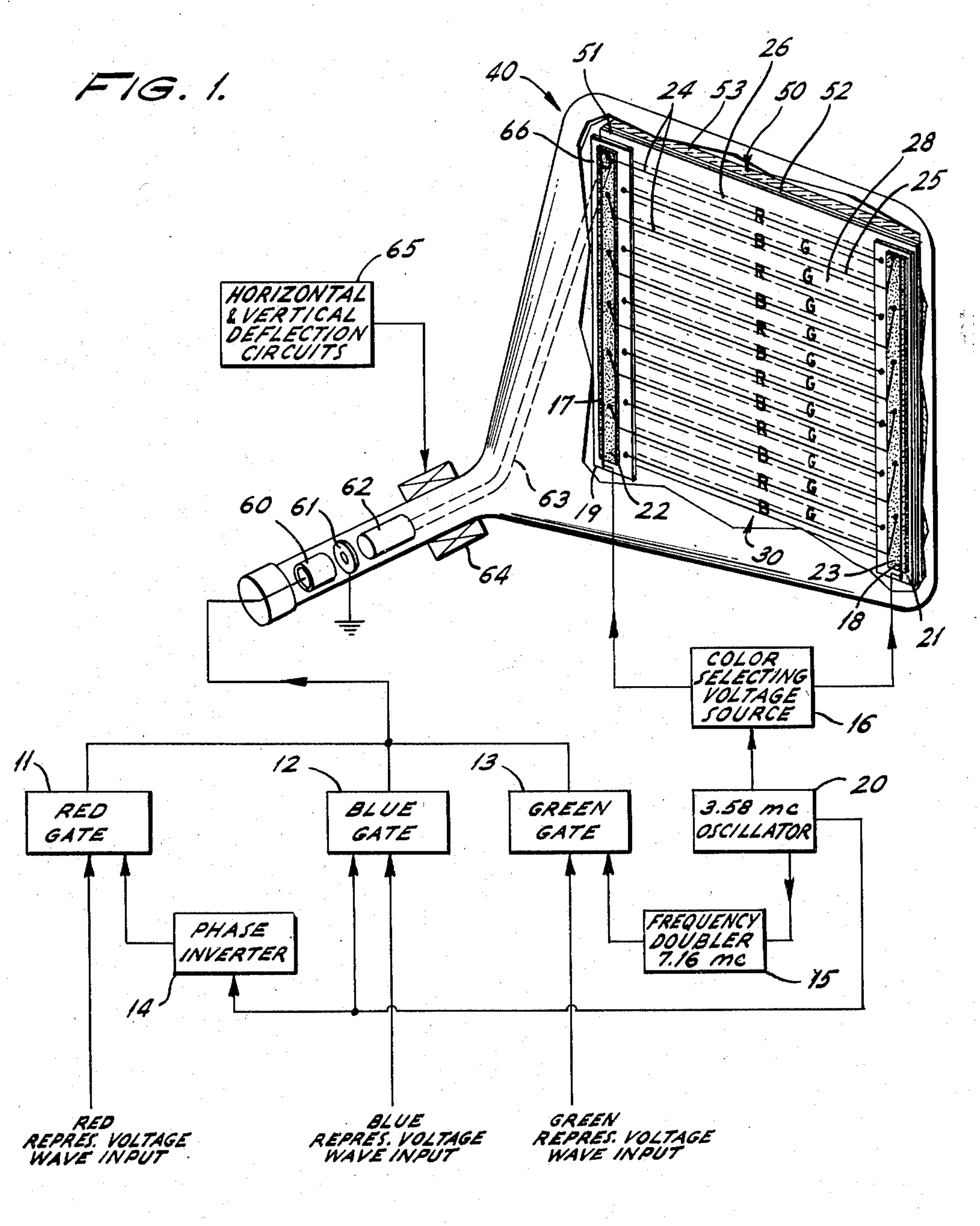

This invention relates to improvements in cathode ray tubes and in particular to improved apparatus for controlling an electron beam produced within a cathode ray tube.

While not limited thereto, my invention is particularly applicable to certain forms of cathode ray tubes suitable for use as the image reproducing devices of color television receivers, and it is with reference to this application that the invention will be described. The type of cathode ray tube to which I refer is characterized by having an image-forming screen structure constituted of a plurality of parallel, elongated strips of phosphor materials. These strips are disposed generally parallel to the conventional horizontal line scanning direction of the cathode ray tube and are disposed either on the interior surface of the face plate proper, or on a separate planar support member of transparent material, e.g., on a sheet of glass supported within the cathode ray tube envelope near the faceplate. Different ones of the aforementioned strips are made of different phosphor materials, respectively emissive of light in three different primary colors such as red, green and blue, for example, strips emissive of light of different colors being disposed in recurrent sequence from top to bottom across the screen structure. The cathode ray tube is equipped with a conventional electron gun for projecting an electron beam towards the screen structure. In addition there is disposed, in the path which the electron beam follows between the gun and the screen structure, a grid of wires parallel to the aforementioned phosphor strips of the screen structure, alternate ones of these wires being electrically connected together. As is well known, if adjacent ones of these wires are maintained at the same potential, the beam will trace upon the screen structure a path defined only by the orientation of the electron gun and by the operation of the conventional horizontal and vertical deflecting means with which the cathode ray tube may be equipped. If, on the other hand, a potential difference is developed between adjacent ones of these wires, the beam will be additionally deflected upward or downward depending upon the polarity of the potential difference. In utilizing a cathode ray tube of the foredescribed type as the image reproducing device of a color television receiver, the geometry of the beam controlling wires is so coordinated with the geometry of the screen structure, and a varying potential difference is so applied between adjacent wires that the electron beam is deflected so as to impinge, in a certain sequence, upon phosphor strips emissive of light in the different primary colors. At the same time, the beam intensity is controlled by means of a signal which represents, during successive time intervals, intelligence concerning these same colors. If this signal is the color television broadcast signal which is now standard for this country, these intervals will recur at a rate of approximately 3.58 megacycles. Consequently coordination between the beam intensity modulation and beam position may be achieved if the aforementioned variations in the potential difference between adjacent wires of the deflecting grid also occur at this 3.58 megacycle rate.

A practical screen structure may be twelve inches high and sixteen inches wide and may comprise approximately 1200 phosphor strips and 800 wires. Since these wires are disposed close to each other and to the phosphor screen structure, the entire wire grid will obviously have a very high value of capacitance. Consequently a large quantity of power will be required from the source which produces the required variations in potential difference between adjacent wires. It has been found that it is economically unfeasible to provide the required quantity of power at the 3.58 megacycle frequency used in the aforedescribed mode of operation.

It is, therefore, a primary object of the invention to provide improved apparatus responsive to the electron beam to activate electrodes in a cathode ray tube which are, in turn, effective to control the beam.

Another object of the invention is to reduce the power required for operating certain beam controlling elements of a cathode ray tube.

Still another object of the invention is to provide improved means for causing the electron beam of a color television cathode ray tube to impinge on predetermined areas of its fluorescent screen.

The construction of apparatus which achieves these objects, as well as others which will appear, is predicated on the realization that, although the type of cathode ray tube under consideration is equipped with beam controlling wires for all portions of its screen structure, only a few of these wires are actually effective to control the beam during any given time interval. Accordingly, I provide apparatus which is associated with the beam controlling wires in such a manner that only those wires which are to exert a controlling influence on the beam during a certain interval are actually connected to the source of energizing potential during that interval, all other wires being effectively disconnected from this source during the same interval. In this manner, the value of the capacitance which is driven from this source, and also the power required from this source, is substantially decreased. Furthermore, in order to establish the proper time coincidence between the interval of energization of any particular beam controlling wire, or group of wires, and the interval during which the beam is subject to its control influence, I utilize the electron beam itself to establish the necessary selective connections between some of the wires and the source of potential.

To this end I provide, intermediate each beam controlling wire and its connection to the potential source, a connecting means which has low conductivity before it is impinged by the electron beam, and which responds to beam impingement to establish a highly conductive path between the potential source connection and the beam controlling wire. I further dispose these variably conductive connecting means so that any given connecting means is struck by the electron beam either during, or immediately preceding, the interval during which the beam is subjected to the control of the associated controlling wire. In the latter case, I construct the connecting means in such manner that it continues to provide the aforementioned highly conductive path for the entire duration of the subsequent control interval.

Figures 1A, 2:
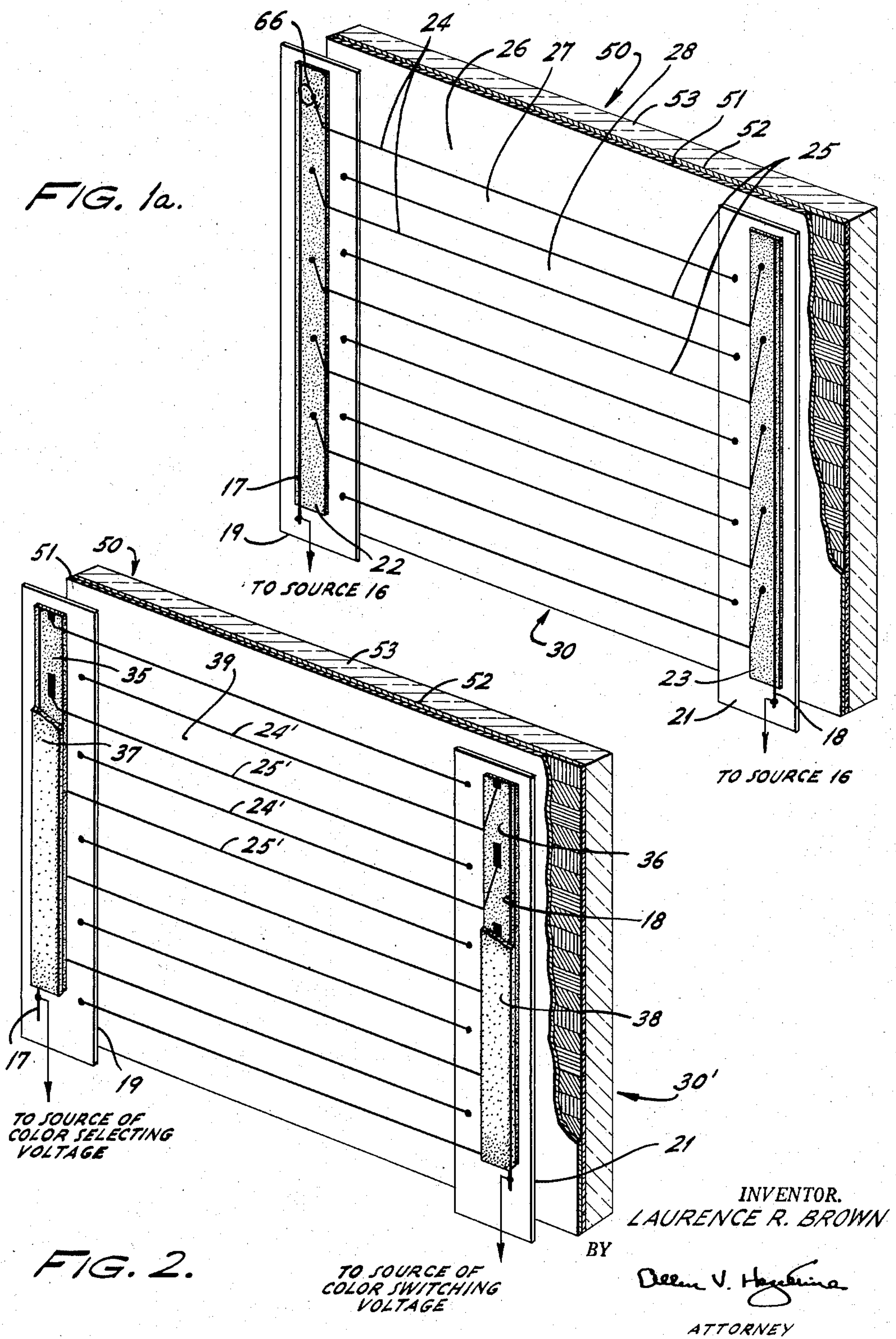
Figure 3:
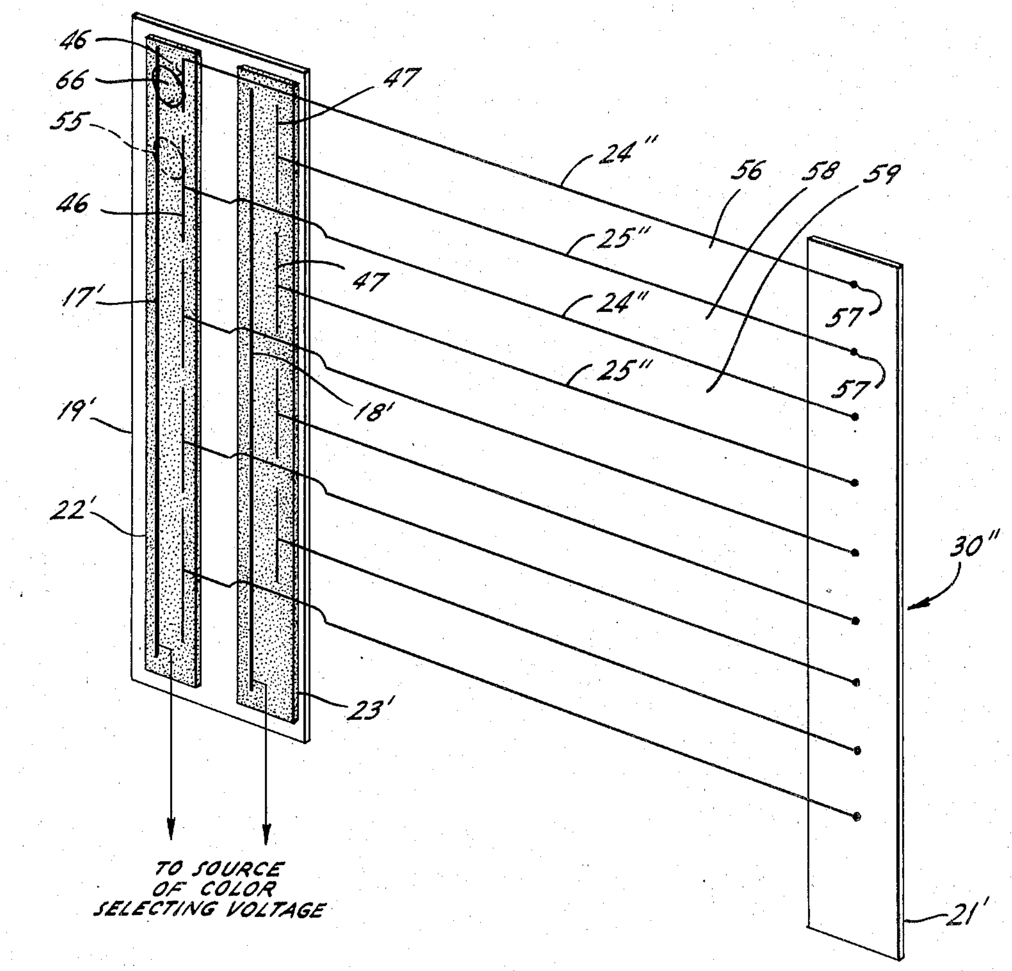

Figure 1 is a block and schematic diagram of a color television system incorporating one form of my invention;

Figure 1*a* is an enlarged perspective view of the grid and image-forming structures of the cathode-ray tube shown in Fig. 1;

Figure 2 is a perspective and partially sectional view of an apparatus for use with a cathode ray tube which includes another form of my invention; and Figure 3 is a perspective view of a grid structure constructed in accordance with my invention.

In Figure 1 there is shown a portion of a color television reproducing system using a cathode ray tube of the type described. It will be assumed for purposes of explanation that the color television signals which have been transmitted and received conform to the standards for U.S. broadcast transmission approved by the Federal Communications Commission. Not shown are the portions of the receiver which extract the composite color video signal from the transmitted modulated carrier. Also not shown are those portions of the receiver which demodulate the chrominance components of the color video signal and derive three voltage waves respectively representative of the red, green, and blue components of a televised scene. These portions of a color television receiver may be of conventional construction and therefore need no further explanation.

A cathode ray tube 40 is shown which includes a cathode 60, a grounded grid 61, and conventional beam shaping and accelerating apparatus indicated schematically at number 62. As a result of the action of cathode 60, grid 61 and the apparatus 62, the beam 63 is produced. It is deflected horizontally and vertically in response to the fields produced when the conventional deflection yoke 64 is energized. The deflection circuits 65 generate the required waves at the horizontal line and field repetition rate which are used, in turn, to energize the horizontal and vertical windings respectively of the yoke 64 which is positioned around the neck of the tube. Within the cathode ray tube 40 a grid structure 30 is located in front of an image-forming screen structure 50. The construction of the grid and screen structures is shown in an enlarged view in Fig. 2*a* and will be explained at greater length hereinafter.

The grid structure 30 is supplied with a sine wave having a frequency of 3.58 mc. from the color selecting voltage source 16 which in turn is supplied with a voltage wave at the same frequency from oscillator 20. The source 16 may comprise a conventional power amplifier whose output is connected to selected ones of the two sets of wires on the grid structure 30 in response to the impingement of the electron beam 63 upon certain portions of structure 30 in a manner to be explained hereinafter. As a result of the combined effect of the fields produced by the yoke 64, and by the grid structure 30, the electron beam 63 is so deflected that it traces a plurality of essentially horizontal and generally parallel sinusoidal paths on the scanned surface of the image screen 50.

The three derived voltage waves respectively representative of the different color components of the televised scene, are applied to the respective input circuits of gates 11, 12 and 13 (hereinafter termed the "red," "blue" and "green" gates, respectively) in which they are sampled at respectively different intervals. Each of the gates 11, 12 and 13 may comprise a tetrode such as a 6CD6 (or tubes like the 6BQ6 or the 6CL6) to whose control grid a corresponding one of the color representative voltage waves may be applied. These tubes are operated at cutoff with no signal input. To the screen grid of each tube are applied sine waves having given frequency and phase characteristics.

The particular sine waves which are applied to each of the gates are derived from the oscillator 20 which also energizes the color selecting voltage source 16 as will be seen hereinafter. The oscillator 20 supplies a wave at the frequency of the color subcarrier, i.e., approximately 3.58 mc., directly to one input of blue gate 12. A similar wave of opposite polarity is applied to red gate 11 by phase inverter 14. To one input of the green gate 13 a sine wave having a frequency of 7.16 mc. is applied by way of a conventional frequency doubler 15 constructed to double the frequency of the sine wave applied to the green gate 13. The reason for doubling the frequency at which the green representative voltage wave is sampled is as follows: As the beam moves in a sinusoidal path between any two adjacent wires of the grid structure 30 it traverses, during each cycle of the sinusoid, the red phosphor strip say, from approximately 0° to 135°, the green phosphor strip from 135° to 180°, the blue phosphor strip from 180° to 215°, and the green phosphor strip again from 215° to 360°. Thus the beam 63 scans each phosphor strip during intervals comprising 135° of the sinusoid during each cycle. The sampling waves supplied from oscillator 20 cause the outputs of the respective gates to produce pulses whose amplitudes are determined respectively by the instantaneous amplitudes of the color representative voltage waves applied to the respective gates. These pulses occur during intervals corresponding to the intervals during which the electron beam 63 traverses the corresponding phosphor strips. Since the gates have a common output circuit these pulses are combined into a single wave which is applied to the cathode 60 which controls the intensity modulation of the electron beam 63 produced within tube 40.

The construction of the grid structure 30 and the screen 50 will now be described with reference to Figure 1*a* to assist in explaining how they affect the beam 63. The grid structure 30 comprises two rigid vertical supporting members 19 and 21 on which thin connective strips 22 and 23 of an insulator or of a semi-conductive material have been deposited. The conductive elements 17 and 18 are in contact with the strips 22 and 23. Wires 24 of the grid structure 30 are affixed to the strip 22 at one end, and to the supporting member 21 at the other. Wires 25, which are interleaved with wires 24, are affixed at one end to the strip 23 and at the other end to the supporting member 19. The portions of the wires 24 and 25 which are respectively affixed to the strips 22 and 23 are inclined with respect to the other portions of the wires for reasons which will be explained below. The inclined portion of each wire 24 ends at a point on strip 22 which is lower than the adjacent wire 25 next above. The inclined portion of each wire 25, on the other hand, ends at a point on strip 23 which is higher than the adjacent wire 24 next above.

It should be noted that the wires 24 and 25 are not directly connected to the elements 17 and 18 so that the color selecting voltage wave from source 16 is not applied to all the wires 24 and 25 simultaneously.

An image screen 50 is positioned in tube 40 on the side of the grid structure 30 which is remote from the electron gun. The image screen 50 comprises an electron-permeable and light reflective coating 51 of aluminum, for example, deposited on a plurality of horizontal fluorescent phosphor strips 52 which emit light of the primary colors red, blue and green when the electron beam 63 impinges thereupon. To aid in visualizing the structure, the phosphor strips 52 behind the coating 51 are indicated in Fig. 1 by dashed lines and the letters R, G, and B have been inserted denoting the color of the light (i.e. red, green or blue) emitted by each strip. It is seen that there is a green phosphor strip situated beween every red and blue strip, and that each green strip is opposite the space between any two adjacent wires 24 and 25 respectively. The phosphor strips 52 may be deposited on a transparent supporting plate 53, as shown, or on the inner surface of the faceplate of tube 40 itself.

The operation of the grid structure 30 will now be explained on the assumption that a televised scene is to be reproduced in successive, non-interlaced fields. Assume further that the beam 63 first scans along the space 26 above the topmost of the wires 24. At the very beginning of the scanning of space 26 the impinging area 66 of the beam as shown in Fig. 1, covers one end of the element 17, the inclined portion of the topmost of the wires 24, and the portion of strip 22 intermediate them. As a result, the topmost wire 24 is effectively connected to element 17 (and hence to source 16) because the impingement of the beam 63 on the intermediate portion of strip 22 renders the latter highly conductive. This phenomenon is known as "bombardment-induced conductivity" and occurs when a thin (0.5–1.0 micron) layer of an insulator or a semi-conductor, between whose opposite surfaces a potential difference exists, is bombarded by an electron beam which has sufficient energy to penetrate the layer somewhat. The induced conductivity may produce a conduction current which is, in many cases, greatly in excess of the current of the bombarding particles. Such materials as zinc sulfide, magnesium oxide, silicon carbide and stibnite, which normally are insulators, exhibit the bombardment-induced conductivity effect. Some semiconductors, such as red amorphous selenium, also exhibit this effect. A detailed account of bombardment-induced conductivity may be found in an article in vol. 75 of "Physical Review" beginning at page 472.

After connecting the top wire 24 to source 16, the beam 63 then scans along the rest of the space 26 until finally, at the end of this space, its impinging area 66 simultaneously covers the inclined portion of the highest wire 25, the top end of element 18, and the portion of the semiconductive strip 25 intermediate them. Therefore the highest of the wires 25 will be connected to the element 18 as a result of the bombardment conductivity induced in the portion of strip 22 impinged upon by the beam 63. The strip 22 is constructed to have such physical or chemical properties that its conductivity will persist even after the beam 63 no longer impinges thereupon. In the grid structure 30 as depicted in Fig. 1, the conductivity of the strip 22 should persist for about 128 μs. (microseconds), the time required to scan two lines of a conventional television raster. The persistence of the induced conductivity of strip 23 need be only half that of strip 22 as will be demonstrated hereinafter.

Under these conditions, the highest one of the wires 24 will be connected to the source 16 during the interval 0–128 μs. Likewise, the highest of the wires 25 will be connected to the source 16 during the interval 64–128 μs. Thus, only the capacitance between the first of the wires 24 and 25 will load down the source 16 during the interval 64–128 μs., i.e., during the interval when the space 27 is scanned by the beam 63. When the beam arrives at the end of its scan of the space 27 it again connects the highest of the wires 25 to source 16 so that the latter wire is again connected to source 16 during the interval 128–192 μs. At the end of the scanning of space 27 the beam 63 turns on the second of the wires 24, which remains connected during the interval 128–256 μs., and commences scanning the next space. Meanwhile the first wire 25 remains connected to source 16 whereas the first wire 24 is uncoupled therefrom. Thus only the first wire 25 and the second wire 24 are connected to source 16 when the beam 63 scans between them. This sequence continues in like fashion throughout the rest of the field at which time a new cycle of scanning begins.

In another form of the invention, photoconductive strips may be substituted for the electron sensitive strips 22 and 23 of Fig. 1. In this case, strips of a fluorescent material are disposed in light-communicating relation to the respective photoconductive strips. Figure 2 is an enlarged perspective and partially sectional view of a grid structure 30′ and an image screen 50 according to this form of the invention. Parts identical to those in Fig. 1 are identically numbered and will not be described further. The elements 17 and 18 are mounted in contact with strips 35 and 36, which are composed of a photoconductive material such as cadmium sulfide and which are deposited on supporting members 19 and 21, respectively. Strips 37 and 38 are mounted over strips 35 and 36 respectively. The strips 37 and 38 consist of materials which fluoresce upon impact by an impinging electron beam.

When the beam 63 is about to scan a space 39 it will impinge momentarily on an area of fluorescent strip 37 which is in contact with the element 17 and with the inclined and broadened end portion of the wire 25′. The area of strip 37 upon which the beam 63 impinges will thereupon emit either visible or invisible light causing the area of photoconductive strip 35 adjacent thereto to become more conductive thus effectively connecting wire 25′ to element 17. When the beam has completed its scan of the space 39 it will impinge on the region of strip 38 near the inclined end portion of the second wire 24′, the element 18 and the portion of photoconductive strip 36 contiguous thereto. So long as these portions of fluorescent strips 37 and 38 which are impinged upon continue to emit light, the wires in proximity thereto will be connected to the source 16. Assuming that the transmitted signals are not vertically interlaced, the inclined portions of the wires 24′ and 25′ are disposed in the same manner as are their counterparts shown in Fig. 1. It should be noted that the ends of the wires 24′ and 25′ have been broadened out. This construction insures that, with a beam of a given cross-section, the impinging area 66 makes simultaneous contact with the semiconductive strips 35 and 36, and with elements 17 and 18 respectively. It also tends to reduce the contact resistance of the wires where they are fastened to the semiconductive strips 35 and 36. The persistence of the fluorescent material of strip 37 may be approximately 128 μs. as compared with a persistence of 64 μs. for strip 38 if the decay time of the photoconductive material is relatively short, because it is the light emitted by the fluorescent material which causes the portion of the photoconductive strip in proximity thereto to remain conductive. Of course, if the decay time of the photoconductive material is made longer, the persistence of the fluorescent material may be correspondingly reduced.

Both of the previous forms of the invention included strips of variable conductivity disposed at opposite ends of the horizontal wires. As a result, the persistence of the increased conductivity of the strip on the left was made to differ considerably from that of the strip on the right. This is so because the electron beam activates any two adjacent wires at times separated by the time required to scan each beam path.

Figure 3 shows still another form of the invention in which both of the strips of varying conductivity are placed on the same side of the grid structure. The beam thus impinges on both strips at a time just prior to its being deflected between any two adjacent wires. The strips 22′ and 23′ are both mounted on a common supporting member 19′. The persistence of the bombardment-induced conductivity of both strips 22′ and 23′ is made to be approximately the same since the impinging area 66 makes contact with both at the beginning of its traversal of the spaces 56, 58 and 59, for example. Since wire 24″ should not make physical or electrical contact with element 18′ or with other parts of strip 23′, the wires 24″ and 25″ are so mounted that they do not extend in the same plane throughout their entire length. The wires 24″ are therefore arranged to pass over the strip 23′. All the ends 57 of both sets of wires 24″ and 25″ are connected to the non-conductive supporting element 21′. The end portions 46 and 47 of the wires 24″ and 25″ respectively, extend approximately vertically upward and downward with respect to the main portions of the wires 24″ and 25″. The reason for this will become apparent from the explanation of the operation of the grid structure 30″ which follows.

When the beam 63 begins to scan the space 56, for example, its impinging area 66 first connects the top wire 24″ to the source of color selecting voltage as shown. Because the persistence of the bombardment conductive effect is made to be approximately 64 μs the top wire 24″ will remain connected during the entire traversal of space 50 by the beam 63. The impinging area 66 is then moved a short distance toward the right and connects the highest wire 25″ to the color voltage switching source by making contact simultaneously with element 18′, the end portion 47, and the semiconductive material intermediate them. The highest wire 25″ also will then be connected to the color switching voltage source during an interval of 64 $\mu$s. When the beam 63 is traversing the space 56 it is therefore subjected to the varying field which exists only between the topmost of the wires 24″ and 25″.

After the beam has traversed space 50 it is swept back by the deflection system to the left edge of grid structure 30″ whereupon it begins its traversal of space 58 or 59 depending upon whether the scan is to be interlaced or not.

Assuming for purposes of explanation that non-interlaced scan is to be used, the beam 63 will next be deflected along the space 58. Its impinging area at the beginning of the traversal of space 58 will be in a position indicated by the dashed-line circle 55. It will first connect the upper part of the end portion 46 of the second highest wire 24″ to the source of the color selecting voltage and then, after moving from left to right, it will connect the bottom part of the end portion 47 of the top wire 25″ to the same source. The scanning of the rest of the frame will be carried out after which a new cycle will be initiated.

It is, of course, possible to employ the principle of the embodiment shown in Fig. 2 with the structure mounted as shown in Fig. 3. For example, the strips 22′ and 23′ of Fig. 3 can be replaced by suitable photoconductive strips, and fluorescent strips can be deposited in proximity thereto. Each of the fluorescent strips should also have a persistence of about 64 $\mu$s; in other respects the operation of the structure 30″ would be identical to that of the structure 30′ of Fig. 2.

It should be appreciated that the aforedescribed material of variable conductivity need not be disposed laterally between the conductive element 17 (or its various counterparts) and the ends of the grid wires. Instead, this material of variable conductivity may be placed behind and in contact with the element 17, whereas the ends of the wires may be placed in back of and in contact with the material of variable conductivity. Thus the beam 63 would first impinge upon the element 17, then on the material of variable conductivity, and finally on the ends of the grid wires, although the entire period of time involved is extremely short and the impingement upon those portions of this type of grid structure is essentially simultaneous. Of course, the order of the elements in this form of the invention can be reversed, i.e., these elements may be disposed in such manner that the beam will impinge first upon the ends of the wires, then on the intermediate material of variable conductivity, and finally on the conductive element 17.

Although all of the embodiments of the invention illustrated in Figs. 1–3 show wires whose end portions are inclined with respect to the major portions thereof, it is possible to employ wires which are entirely straight and do not have any inclined end portions at all. Each straight wire is then connected to one of the vertical conductive elements by defocusing the beam when it impinges upon the strips of the variable conductivity material, so that its impinging area is made sufficiently large to cover the end of one of the horizontal wires, the vertical conductive element, and the portion of the variably conductive strip intermediate them.

The color selecting voltage wave may be applied, not only to the two adjacent wires of the grid structure through which the electron beam is to pass, but also to as many of the other wires as is desired. This may be accomplished by joining end portions of wires which are to be connected to the color selecting voltage source during the same intervals. If this is done, the persistence of conductivity in the strips of variable conductivity should be adjusted accordingly.

The strips of material of variable conductivity need not necessarily make actual physical contact either with the ends of the horizontal wires or with the vertical conductive elements. Even if they are separated by a very small space there will nonetheless exist a capacitive relation between them which constitutes a very low impedance connection at the relatively high frequency which is typical of the color selecting voltage wave.

Another form which the invention may take is one in which two electron beams are used. In such case a first electron beam can be used to connect the desired horizontal wires to the color selecting voltage source. A second beam can be intensity modulated and used to scan the spaces between the wires to produce the desired luminous image corresponding to the televised scene. In this event, the first beam may be caused to impinge on the material of variable conductivity during the entire time that the second beam is swept through that space within which it is subject to the field of the wires which are connected to the color selecting voltage source by the first beam.

It is also obvious that, instead of disposing a continuous vertical strip of a material having variable conductivity on the vertical supporting members, small discrete units of this material may be disposed thereon intermediate the ends of the respective horizontal wires and a corresponding vertical conductive element.

It will be understood that still other embodiments and applications of screen structures according to our invention will occur to those skilled in the art. Consequently, we desire the scope of this invention to be limited only by the appended claims.

I claim:

1. In a cathode ray tube which includes means for producing an electron beam, a grid structure comprising: first and second supporting members in substantially parallel spaced relation to one another, first and second strips of a material having inherently relatively low conductivity, said material further being characterized by having relatively high conductivity in response to the impingement of electrons thereupon, said relatively high conductivity persisting for a period of time at least as long as the time taken for one traverse of the viewing screen by said beam, the period of time during which the relatively high conductivity of said first strip persists being approximately twice as long as the corresponding period of said second strip, first and second elongated conductive elements disposed lengthwise of, and in contact with, said first and second strips respectively, a first plurality of substantially parallel conductive elements disposed generally perpendicular to said supporting members, each element of said first plurality of elements having one end portion thereof in contact with said first strip and having its other end portion in contact with said second supporting member, and a second plurality of substantially parallel conductive elements interleaved with said first plurality of conductive elements, each of said second plurality of elements having one end portion thereof in contact with said second strip and its other end portion in contact with said first supporting member, those end portions of said elements in contact with said first and second strips also being arranged to extend transversely thereto.

2. In a cathode ray tube which includes means for producing an electron beam, the combination comprising: first and second conductive elements provided with respective connections for the application of a potential thereto, first and second pluralities of interleaved, parallel elongated elements disposed substantially perpendicular to said first and second conductive elements, said conductive elements being constructed and arranged to control said beam in response to the application of said potential thereto, first means intermediate one end of each of said first plurality of elements and said first conductive element, second means intermediate one end of each of said second plurality of elements and said second conductive element, said first and second intermediate means having inherently relatively low conductivity and being constructed and arranged to have relatively high conductivity in response to the impingement of electrons thereupon, means for deflecting said beam in a plurality of generally parallel spaced paths in the spaces between adjacent elongated elements and means for causing said beam to impinge on at least one of said intermediate means during its traversal of each said path, said impinged intermediate means being constructed to have said relatively high conductivity in response to impingement by said beam for a time interval at least as long as the time interval required for said beam to be deflected along one of said plurality of beam paths, the period of time during which the relatively high conductivity of said first intermediate means persists being approximately twice as long as the corresponding period of said second intermediate means.

3. In a cathode ray tube which includes means for producing an electron beam, the combination comprising: first and second supporting members in substantially parallel spaced relation to one another, first and second strips of a material having an inherently low conductivity, said strips being constructed and arranged to have relatively high conductivity in response to the impingement of electrons thereupon, said relatively high conductivity persisting for a period of time at least as long as the time taken for one traverse of the viewing screen by said beam, said period of time during which the relatively high conductivity of said first strip persists being approximately twice as long as the corresponding period of said second strip, first and second elongated conductive elements disposed lengthwise of, and in contact with, said first and second strips respectively, a first plurality of spaced substantially parallel conductive elements disposed generally perpendicular to said supporting members, each element of said first plurality of elements having one end portion thereof in contact with said first strip and having its other end portion in contact with said second supporting member, a second plurality of spaced substantially parallel conductive elements interleaved with said elements of said first plurality and in spaced parallel relation thereto, each element of said second plurality having one end portion thereof in contact with said second strip and its other end portion in contact with said first supporting member, said end portions of each of said first plurality of elements in contact with said first strip extending transversely thereto for a distance not greater than the distance between any two adjacent elements of said first and second pluralities and said end portions of each of said second plurality of elements in contact with said second strip extending transversely thereto for a distance greater than the distance between any two adjacent elements of said first and second pluralities, and means for deflecting said electron beam along a plurality of paths generally in the spaces between elements of said first and second pluralities of elements.

References Cited in the file of this patent

UNITED STATES PATENTS

| | | |
|---|---|---|
| 2,692,532 | Lawrence | Oct. 26, 1954 |
| 2,713,604 | Pensak | July 19, 1955 |
| 2,728,021 | Blanks | Dec. 20, 1955 |